(12) United States Patent
Allione (10) Patent No.: US 10,739,615 B2
(45) Date of Patent: Aug. 11, 2020

(54) EYEGLASSES ADAPTED TO A WEARER, EYEGLASSES KIT FOR MANUFACTURING SAID EYEGLASSES, AND METHODS ASSOCIATED

(71) Applicant: ESSILOR INTERNATIONAL (Compagnie Generale d'Optique), Charenton-le-Pont (FR)

(72) Inventor: Pascal Allione, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 299 days.

(21) Appl. No.: 15/566,922

(22) PCT Filed: Apr. 15, 2016

(86) PCT No.: PCT/EP2016/058327
§ 371 (c)(1),
(2) Date: Oct. 16, 2017

(87) PCT Pub. No.: WO2016/166270
PCT Pub. Date: Oct. 20, 2016

(65) Prior Publication Data
US 2018/0129068 A1 May 10, 2018

(30) Foreign Application Priority Data
Apr. 17, 2015 (EP) .................................... 15305582

(51) Int. Cl.
*G02C 5/02* (2006.01)
*G02C 5/00* (2006.01)
(Continued)

(52) U.S. Cl.
CPC ............. *G02C 5/045* (2013.01); *G02C 5/126* (2013.01); *G02C 2200/08* (2013.01)

(58) Field of Classification Search
CPC ... G02C 5/00; G02C 5/02; G02C 3/04; G02C 7/02; G02C 7/04
(Continued)

(56) References Cited

U.S. PATENT DOCUMENTS 4,331,393 A 5/1982 Bradley
4,762,406 A 8/1988 Steiner
(Continued)

FOREIGN PATENT DOCUMENTS

CN 2763828 3/2006
CN 107533240 1/2010
(Continued)

OTHER PUBLICATIONS

International Search Report, PCT/EP2016/058327, dated Jun. 8, 2016.

*Primary Examiner* — Dawayne Pinkney
(74) *Attorney, Agent, or Firm* — Young & Thompson (57) ABSTRACT

Disclosed are eyeglasses adapted to a wearer, including two half-frames interconnected by a bridge, each half-frame including at least a branch and an ophthalmic lens. The bridge of the eyeglasses is made of a separated element attached to each of the half-frames, the bridge having at least one geometrical feature determined by taking into account a morphologico-geometric parameter of the wearer. Also disclosed is a kit and a method for manufacturing the eyeglasses and a method for ordering the eyeglasses.

20 Claims, 2 Drawing Sheets

(51) Int. Cl.
*G02C 1/08* (2006.01)
*G02C 7/02* (2006.01)
*G02C 13/00* (2006.01)
*G02C 5/04* (2006.01)
*G02C 5/12* (2006.01)

(58) Field of Classification Search
USPC ......... 351/124, 41, 56, 133, 159.01, 159.73, 351/159.74, 178
See application file for complete search history.

(56) References Cited

U.S. PATENT DOCUMENTS

| | | |
|---|---|---|
| 7,347,545 B1 | 3/2008 | Jannard et al. |
| 2018/0129068 A1 | 5/2018 | Allione |

FOREIGN PATENT DOCUMENTS

| | | |
|---|---|---|
| EP | 1 193 533 | 4/2002 |
| GB | 2 410 805 | 8/2005 |
| JP | S57-128313 | 8/1982 |
| WO | WO 2008/103386 | 8/2008 |

EYEGLASSES ADAPTED TO A WEARER, EYEGLASSES KIT FOR MANUFACTURING SAID EYEGLASSES, AND METHODS ASSOCIATED

TECHNICAL FIELD OF THE INVENTION

The invention relates to eyeglasses adapted to a wearer, comprising two half-frames interconnected by a bridge, each half-frame comprising at least a branch and an ophthalmic lens.

The invention also relates to an eyeglasses kit for manufacturing such eyeglasses.

The invention further relates to a method for manufacturing such eyeglasses adapted to a wearer and a method for ordering such eyeglasses adapted to a wearer.

BACKGROUND INFORMATION AND PRIOR ART

In order to manufacture eyeglasses adapted to a wearer, the wearer usually choose a prebuilt frame, and the optician determines the features of the ophthalmic lenses in order for them to be positioned correctly in front of the eyes of the wearer, when he wears the chosen frame.

The prebuilt frame is usually tried on by the wearer before adding the ophthalmic lenses in order to check the adequacy of the dimensions of the frame with the shape of the face of the wearer.

The dimensions of the frame are indeed predetermined, and needs to fit the face of the wearer in order for the eyeglasses to rest in a comfortable and stable position on the face of the wearer, efficient for vision correction.

More precisely, one considers that the eyeglasses rest in an efficient and comfortable position when
- the rims of the frame are positioned relative to the eyes of the wearer in a way that provides a large vision field to the wearer,
- the eyeglasses frame rests on the nose of the wearer, without sliding or hurting him, in a stable fashion,
- the branches of the eyeglasses frame rest on the ears of the wearer, without pressing on the temples, or pulling on the ears.

Moreover, the dimensions of the frame must allow a correct placement of the ophthalmic lenses in front of the eye of the wearer, that is to say a correct centering of the ophthalmic lenses in front of the eye of the wearer.

Given all these criteria that should be fulfilled by the chosen eyeglasses frame, most frames come in different sizes. The wearer must then choose a design frame and then tries different sizes to determine which is best fitted to his face.

It is however difficult for the optician to carry many sizes for all the frames proposed in his office.

It is moreover very time-consuming to try on many different designs and sizes of frames in order to choose one that is adapted to the wearer.

Besides, because of the necessity to determine precisely if the frame fits the wearer and which size of frame would be best, it is difficult to sell eyeglasses online, since trying on the frame is not possible in this case.

Methods for virtually trying on eyeglasses frames are known, but do not provide sufficiently precise results.

SUMMARY OF THE INVENTION

Therefore one object of the invention is to provide a new type of eyeglasses adapted to a wearer, that can be chosen without trying on the frame, therefore reducing the time spent with the optician and even allowing easy online ordering of the eyeglasses while insuring that the ordered frame will fit the wearer correctly.

The above object is achieved according to the invention by providing eyeglasses as described in introduction, wherein said bridge of the eyeglasses is made of a separated element attached to each of said half-frames, said bridge having at least one geometrical feature determined by taking into account a morphologico-geometric parameter of said wearer.

In the eyeglasses according to the invention, the bridge is made of a separated piece, which allows to manufacture prebuilt standardized half-frames and nonetheless obtain customized eyeglasses by interconnecting the standardized half-frames with a customized bridge.

The bridge is indeed a key piece of the frame in order to adapt the eyeglasses to the wearer in that it may be adapted to the shape of the nose of the wearer in order to provide a comfortable fit of the eyeglasses and it may be adapted in length and in height in order to center the ophthalmic lenses relative to the pupils of the eyes of the wearer.

According to other advantageous and non limitative characteristic of the eyeglasses of the invention: —said bridge is selectable from a set of bridges comprising at least two predetermined bridges, said geometrical feature of each bridge of this set of predetermined bridges being different from the geometrical feature of the other bridges of this set;
  said bridge comprises mounting means for attaching said bridge to said ophthalmic lenses or to rims of said half-frames receiving said ophthalmic lens;
  said geometrical feature of the bridge comprises at least one of the following features:
    length of bridge extending between said lenses,
    interior width of bridge receiving the nose of the wearer,
    interior height of bridge receiving the nose of the wearer,
    global height of bridge;
  said morphologico-geometric parameter of said wearer comprises at least one of the following:
    a parameter relative to a category of wearer based on age and/or geographic origin of the wearer,
    a parameter relative to the position of one or both pupils of the wearer in a referential linked to the head of the wearer,
    a parameter relative to the interpupillary distance,
    a parameter relative to the shape of the nose of the wearer;
  The invention also relates to an eyeglasses kit for manufacturing eyeglasses according to one of the previous claims, comprising two half-frames, each half-frame comprising at least a branch and an ophthalmic lens, and a set of at least two predetermined bridges having different geometrical features, each bridge of the set of bridges being provided as a separated element adapted to be attached to each of said half-frames.

Thanks to the eyeglasses kit according to the invention, the shape of the frame may be adjusted to the shape of the face of the wearer. Therefore, the eyeglasses kit may be ordered without trying the corresponding frame on the face of the wearer.

The eyeglasses kit may be built by the wearer himself. It may also be built by another person such as the optician or manufacturer.

According to other advantageous and non limitative characteristic of the kit of the invention:

said set of bridges comprises a number of bridges less than or equal to 10, each having a combination of geometrical features different from the combination of geometrical features of the other bridges of said set of bridges;

the number of bridges of the set of bridges and/or the geometrical features of each bridge of this set of bridges is determined as a function of said morphologico-geometric parameter of said wearer;

the number of bridges of said set of bridges and/or the combinations of geometrical features of each bridge of this set of bridges is determined in order to statistically be adapted to the wearer given said morphologico-geometric parameter of said wearer.

The invention also relates to a method for manufacturing eyeglasses adapted to a wearer, according to which the following steps are performed:

a) providing two half-frames, each half-frame comprising at least a branch and an ophthalmic lens, adapted to be interconnected by a bridge, b) determining a morphologico-geometric parameter of the wearer, c) determining a geometrical feature of the bridge of the eyeglasses based on said morphologico-geometric parameter of the wearer determined, d) providing the bridge exhibiting said geometrical feature and attaching it to said half-frames in order to form said eyeglasses.

According to other advantageous and non limitative characteristic of the method of the invention:

in step b), said morphologico-geometric parameter of the wearer is determined by one of the following steps:
classifying the wearer into a category of wearer based on age and/or geographic origin of the wearer,
measuring said morphologico-geometric parameter of the wearer,
determining said morphologico-geometric parameter of the wearer based on an image of the wearer captured;

in step c), said geometrical feature of the bridge is determined by one of the following steps:
calculating the geometrical feature of the bridge as a function of said morphologico-geometric parameter determined, or
determining statistically said geometrical feature of the bridge as a function of said morphologico-geometric parameter determined;

in step d), said bridge having the geometrical feature determined is manufactured by additive technology;

in step d), a set of bridges comprising at least two bridges having at least one different geometrical feature, each bridge being provided as a separated element adapted to be attached to each of said half-frames, is provided, and in step c), the geometrical feature of the bridge is determined by choosing one bridge among the set of bridges provided, based on said morphologico-geometric parameter of the wearer;

said bridge is chosen among said set of bridges by the following steps:
attaching alternatively each bridge of said set of bridges to the half-frames,
trying alternatively the eyeglasses obtained by attaching each bridge of said set of bridges to the half-frames on the face of the wearer,
determining which bridge of the set of bridges fits the wearer best.

said bridge is chosen among said set of bridges by the following steps:
reading on an abacus which bridge among the set of bridges is to be chosen given the morphologico-geometric parameter of the wearer determined.

The invention finally relates to a method for ordering eyeglasses adapted to a wearer, according to which said wearer orders an eyeglasses kit as described before, and builds himself said eyeglasses using the method for manufacturing eyeglasses described before.

DETAILED DESCRIPTION OF EXAMPLE(S)

The following description, which refers to the enclosed drawings which are appended as not limiting examples, will well explain what the invention is about and how it can be implemented.

DEVICE

Figure 1:
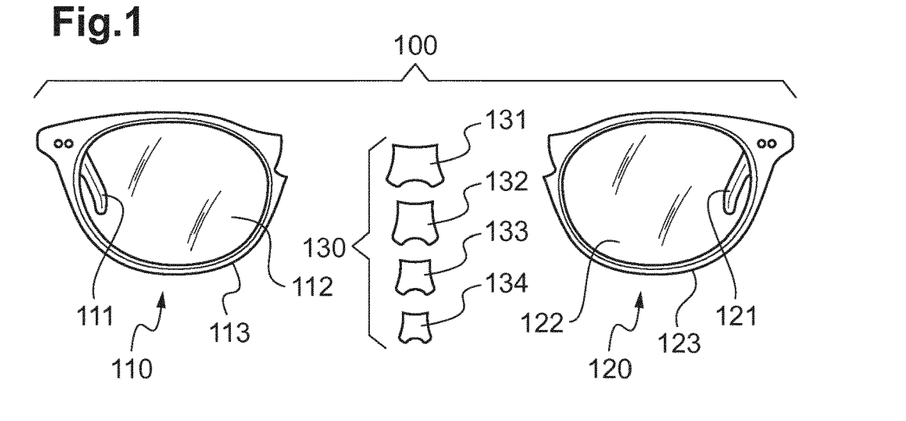
FIG. 1 is a diagrammatic perspective view of an eyeglasses kit according to the invention, comprising a first example of the set of bridges.
Figure 2:
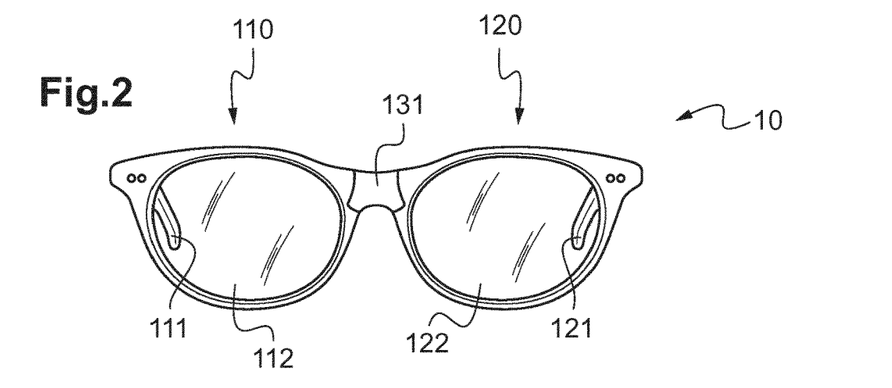
FIG. 2 is a diagrammatic view of the eyeglasses according to the invention obtained by assembling the eyeglasses kit of FIG. 1.

FIG. 1 shows an eyeglasses kit 100 according to the invention for manufacturing customized eyeglasses 10 according to the invention (FIG. 2).

The eyeglasses 10 according to the invention are specifically adapted to the wearer.

The eyeglasses 10 comprise two half-frames 110, 120 interconnected by a customized bridge 131, each half-frame 110, 120 comprising at least a branch 111, 121 and an ophthalmic lens 112, 122.

In the example presented here, each half-frame 110, 120 also comprises a rim 113, 123, connected to the corresponding branch 111, 121, and receiving the corresponding ophthalmic lens 112, 122.

The branches and rim are made of plastic in the example described here.

Alternatively, they may be made of metal.

In a variant, the eyeglasses may be rimless. In this case, each half-frame comprises only a branch attached directly to the corresponding ophthalmic lens. The customized bridge is then attached directly to the lenses in order to connect the two half-frames.

In a remarkable fashion, said customized bridge 131 of the eyeglasses 10 is made of a separated element attached to each of said half-frames 110, 120, said customized bridge 131 having at least one geometrical feature Lp, H, Ln, Hn determined by taking into account a morphologico-geometric parameter of said wearer.

The eyeglasses 10 according to the invention may therefore be adapted to the wearer in that the customized bridge 131 presents a shape especially adapted to the shape of the face of the wearer.

This customized bridge 131 is made of plastic compatible with dermatological restrictions.

Alternatively, it could be made of metal.

The ophthalmic lenses 112, 122 may of course also be especially designed for the wearer. They also may be corrective or non corrective standardized lenses.

Figure 3:
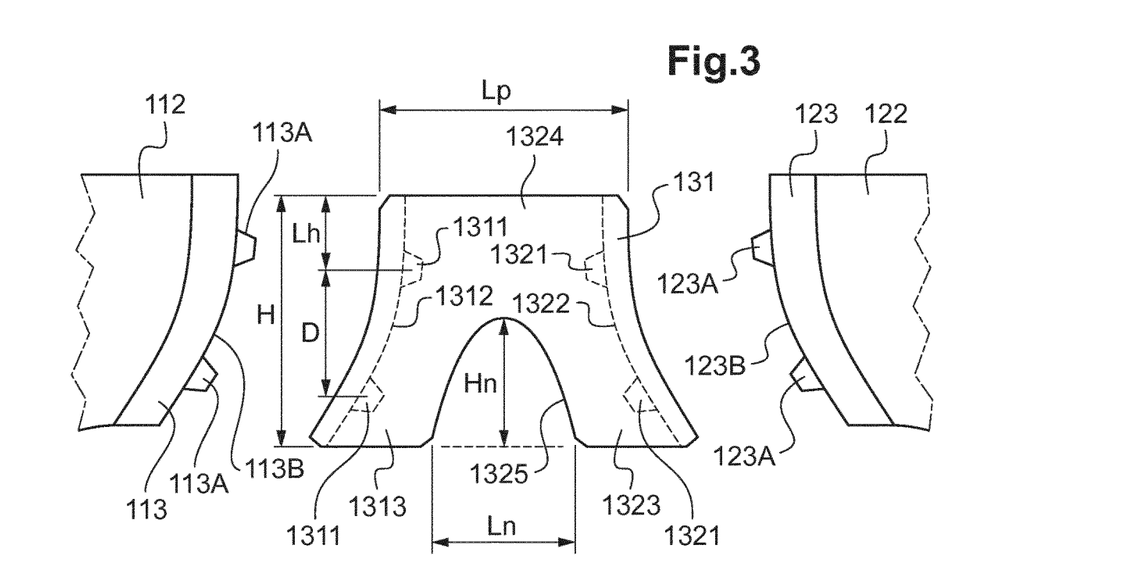
FIG. 3 is a diagrammatic detailed views of a bridge and part of the rims of the eyeglasses kit of FIG. 1.

The shape of the customized bridge 131 is more precisely shown on FIG. 3, along with the definition of several geometrical features Lp, H, Ln, Hn of this customized bridge 131.

This customized bridge 131 presents a complex shape with two legs 1313, 1323 extending substantially vertical and a horizontal link 1324. The interval between the two legs 1313, 1323 defines a recess 1325 adapted to receive a part of the nose of the wearer.

This shape is designed to insure a predetermined pantoscopic angle and wrap angle of the eyeglasses once assembled with the half-frames.

More precisely, said geometrical feature Lp, H, Ln, Hn of the customized bridge 131 that is determined by taking into account a morphologico-geometric parameter of said wearer comprises at least one of the following features:
- length Lp of the customized bridge 131 extending between said lenses 113, 123, defined here as the minimum distance between the rims 113, 123 of the half-frames 110, 120 imposed by the customized bridge 131, this distance being measured horizontally when the eyeglasses 10 are assembled,
- interior width Ln of the customized bridge 131 receiving the nose of the wearer, defined here as the maximum width of the recess 1325 adapted to receive part of the nose of the wearer,
- interior height Hn of the customized bridge 131 receiving the nose of the wearer, defined here as the maximum height of the recess 1325 adapted to receive part of the nose of the wearer,
- global height H of the customized bridge 131, this height being measured vertically when the eyeglasses 10 are assembled.

The horizontal plane is defined here as the plane comprising the main straight part of the branches 111, 121 of the eyeglasses 10.

The vertical direction is perpendicular to this horizontal plane.

Other geometrical features of the customized bridge 131 that may be determined as a function of a morphologico-geometric parameter of the wearer include, for example, the curvature of the recess 1325 of the customized bridge 131, the angle between the legs 1313, 1323 of the customized bridge 131 or the width of each leg 1313, 1323 of the customized bridge 131.

In practice, at least one of these geometrical features is determined taking into account said morphologico-geometric parameter of said wearer comprising at least one of the following:
- a parameter relative to a category of wearer based on age and/or geographic origin of the wearer,
- a parameter relative to the position of one or both pupils of the wearer in a referential linked to the head of the wearer,
- a parameter relative to the interpupillary distance of the wearer,
- a parameter relative to the shape of the nose of the wearer.

These parameters will be discussed in greater details later.

As shown with more precision on FIG. 3, the customized bridge 131 comprises mounting means 1311, 1312, 1321, 1322 for attaching said bridge 131 to said half-frames 110, 120.

More precisely, the customized bridge 131 comprises here mounting means 1311, 1312, 1321, 1322 for attaching said bridge 131 to said rims 113, 123.

In the case where the eyeglasses according to the invention are rimless, the bridge comprises mounting means for attaching said bridge directly to said ophthalmic lenses.

These mounting means 1311, 1312, 1321, 1322 are adapted to cooperate with complementary mounting means 113A, 123A, 113B, 123B of the half-frames 110, 120 for attaching the customized bridge 131 to theses half-frames 110, 120.

Here, the mounting means 1311, 1312, 1321, 1322 comprises clipping means.

These clipping means comprise, on each side of the customized bridge 131, a groove 1312, 1322 adapted to receive the edge 113B, 123B of the corresponding rim 113, 123 of said half-frame 110, 120. In the bottom of the groove 1312, 1322 on each side of the customized bridge 131, two housings 1311, 1321 are arranged in order to receive two corresponding plots 113A, 123A extending in projection from the edge of each rim 113, 123.

Once the plots 113A, 123A are clipped in the housings 1311, 1321 the customized bridge 131 is safely attached to both half-frames 110, 120 and the eyeglasses 10 may be worn by the wearer.

Any other mounting means may be considered by the man skilled in the art in order to attach said bridge to the half-frames, including gluing means, screwing means, magnetic means or interlocking means.

The complementary mounting means of the half-frames may be located on the rims or on the ophthalmic lenses, depending on the type of eyeglasses considered, rimmed or rimless.

Preferentially, the mounting means of the customized bridge allow this customized bridge to be unmounted from the half-frames.

Figure 4:
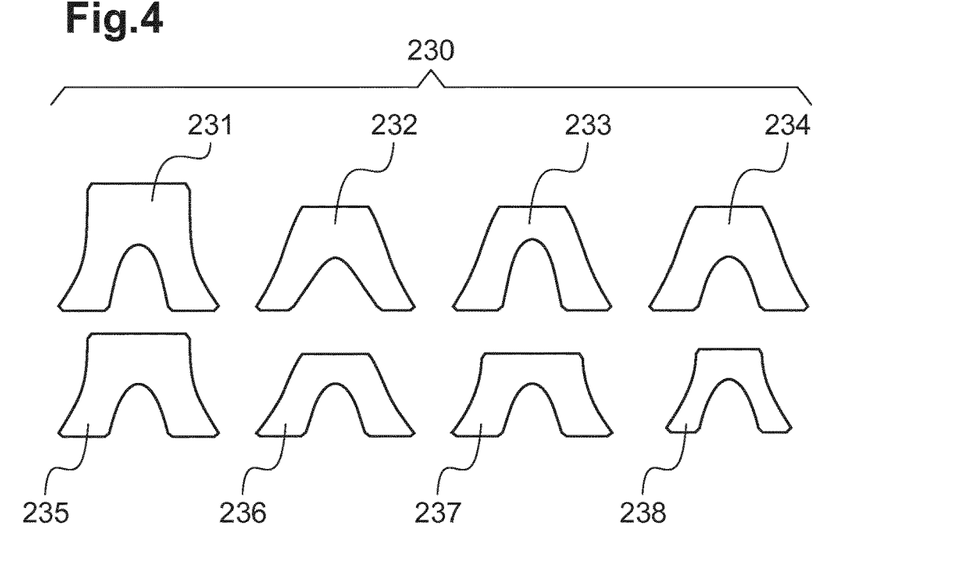
FIG. 4 is a diagrammatic view of a second example of the set of bridges of the eyeglasses kit of FIG. 1.

In a preferred embodiment of the eyeglasses 10 according to the invention, said customized bridge 131 is selectable from a set 130;230 of bridges comprising at least two predetermined bridges 131, 132, 133, 134;231, 232, 233, 234, 235, 236, 237, 238, said geometrical feature Lp, H, Ln, Hn of each predetermined bridge 131, 132, 133, 134;231, 232, 233, 234, 235, 236, 237, 238 of this set 130;230 of predetermined bridges being different from the geometrical feature Lp, H, Ln, Hn of the other bridges 131, 132, 133, 134;231, 232, 233, 234, 235, 236, 237, 238 of this set 130;230.

The eyeglasses kit 100 comprises the two half-frames 110, 120.

In a variant, the eyeglasses kit may be adapted to manufacturing rimless eyeglasses. In this case, each half-frame 110, 120 comprises only a branch attached directly to the corresponding ophthalmic lens.

The eyeglasses kit 100 also comprises the set 130; 230 of at least two predetermined bridges 131, 132, 133, 134; 231, 232, 233, 234, 235, 236, 237, 238 having different geometrical features, each bridge 131, 132, 133, 134; 231, 232, 233, 234, 235, 236, 237, 238 of the set 130; 230 of bridges being provided as a separated element adapted to be attached to each of said half-frames 110, 120.

In the first example shown on FIG. 1, the set 130 of bridges comprises four different bridges 131, 132, 133, 134.

In the second example shown on FIG. 4, the set 230 of bridges comprises eight different bridges 231, 232, 233, 234, 235, 236, 237, 238.

Preferentially, said set 130;230 of bridges comprises a number of bridges less than or equal to 10, each having a combination of geometrical features different from the combination of geometrical features of the other bridges of said set 130;230 of bridges.

This number of bridges of the set 130;230 of bridges and/or the geometrical features of each bridge of this set 130;230 of bridges may be determined as a function of said morphologico-geometric parameter of said wearer, that is to say, by taking into account said morphologico-geometric parameter of said wearer.

For example, the number of bridges and/or at least one geometrical features of each bridge of this set of bridges is determined by taking into account one or a plurality of said morphologico-geometric parameters of the wearer.

For example, the number of bridges of said set 130;230 of bridges and/or the combinations of geometrical features of each bridge of this set 130;230 of bridges is determined in order to statistically be adapted to the wearer given said morphologico-geometric parameter of said wearer.

In particular, the number of bridges and the specific combination of geometrical features of each bridge in the set of bridges may be determined in order to be adapted to as many different wearers as possible having said morphologico-geometric parameter. This implies for example that they are determined in order to be adapted to as many combinations of nose shape, interpupillary distance and pupils position of the wearer as possible, given said morphologico-geometric parameter of said wearer.

In practice, they may be determined to be adapted to different wearers of an identified category, that is to say, for example, to be adapted to different wearers of a predetermined age or geographic origin category.

They may also be determined to be adapted to different wearers having a given interpupillary distance or pupils position in a referential linked to the head of the wearer.

Figure 5:
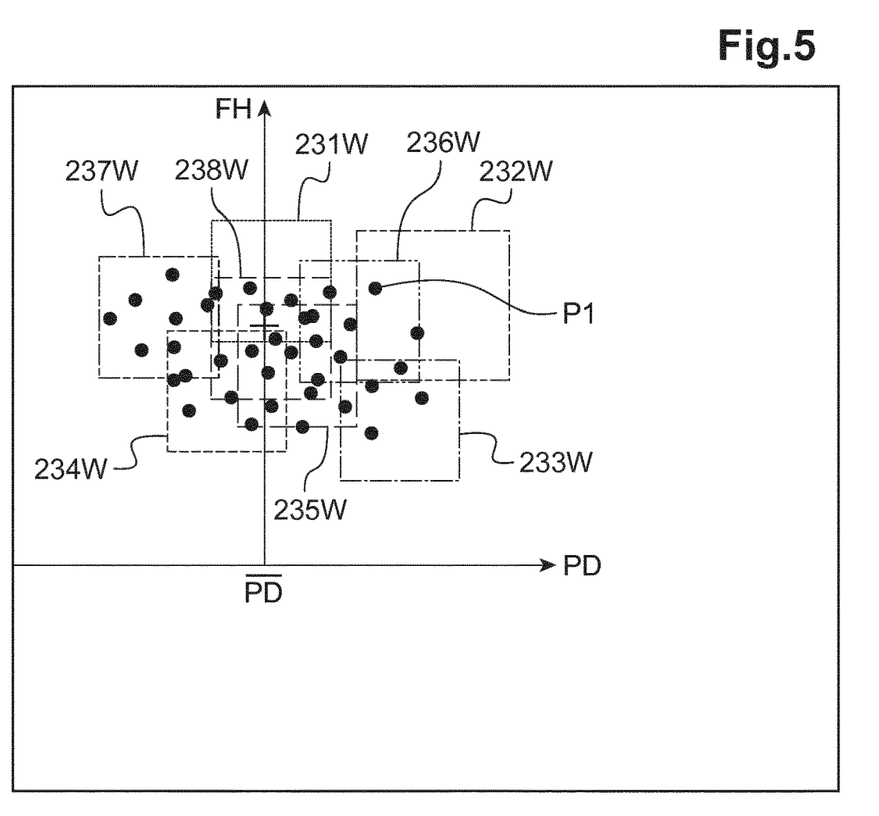
FIG. 5 is a graph showing the interpupillary distance and the fitting height for different wearers, with the groups of wearers for which each bridge from the second example of set of bridges of FIG. 4 is adapted.

FIG. 5 shows for example the interpupillary distance PD and fitting height FH parameters of a group of wearers. Each point on the graph corresponds to a wearer having the interpupillary distance corresponding to the abscissa of this point and the fitting height corresponding to the ordinate of this point.

The fitting height of the wearer corresponds to the pupil height compared to the bottom edge of the ophthalmic lens placed on the head of the wearer.

The fitting height is here determined for reference eyeglasses of a given shape. It will be referred to as the reference fitting height in the following.

The reference value of the interpupillary distance corresponding to the axis of the ordinates is a mean value of the interpupillary distance over the whole population of wearers considered.

Thus, the points on both sides of the axis of the ordinates correspond to interpupillary distances being either larger or smaller than the mean value.

Each zone 231W, 232W, 233W, 234W, 235W, 236W, 237W, 238W delimits internally the range of interpupillary distance and reference fitting height couples for which each of the corresponding eight bridges 231, 232, 233, 234, 235, 236, 237, 238 of the set 230 of bridges of the second example represented on FIG. 4 will be adapted.

As visible on FIG. 5, the set 230 of bridges allows to find at least one adapted bridge for each wearer of the group. For example, two bridges 232, 236 of the set 230 of bridges of FIG. 4 are especially adapted for the wearer having the interpupillary distance and reference fitting height corresponding to point P1 of the graph, as this point is located inside the two zones 232W, 236W corresponding to these two bridges 232, 236.

Process

The method for manufacturing said eyeglasses 10 adapted to a wearer, comprises the following steps:

a) providing said two half-frames 110, 120 adapted to be interconnected by the customized bridge 131, b) determining the morphologico-geometric parameter of the wearer, c) determining the geometrical feature Lp, H, Ln, Hn of the customized bridge 131 of the eyeglasses 10 based on said morphologico-geometric parameter of the wearer determined, d) providing the customized bridge 131 exhibiting said geometrical feature Lp, H, Ln, Hn and attaching it to said half-frames 110, 120 in order to form said eyeglasses 10.

The eyeglasses 10 may be fully assembled before being handed to the wearer.

They may be assembled by the optician or by the manufacturer after ordering the eyeglasses 10.

They also may be assembled by the wearer himself.

Whoever may be the person in charge of finally assembling the eyeglasses 10, in step d), this person may be provided either with the set 130;230 of bridges as described before, comprising at least two bridges having at least one different geometrical feature, each bridge being provided as a separated element adapted to be attached to each of said half-frames 110, 120 (first embodiment of the method) or directly with the customized bridge 131 only (second embodiment of the method).

In step a), the two half-frames 110, 120 are supplied to the person in charge of assembling the eyeglasses.

In step b), said morphologico-geometric parameter of the wearer is determined by one of the following steps:

classifying the wearer into a category of wearer based on age and/or geographic origin of the wearer, measuring said morphologico-geometric parameter of the wearer, determining said morphologico-geometric parameter of the wearer based on an image of the wearer captured.

In step c), said geometrical feature Lp, H, Ln, Hn of the customized bridge 131 is determined by one of the following steps:

calculating the geometrical feature Lp, H, Ln, Hn of the customized bridge 131 as a function of said morphologico-geometric parameter determined, that is to say taking into account this morphologico-geometric parameter determined or determining statistically said geometrical feature Lp, H, Ln, Hn of the customized bridge 131 as a function of said morphologico-geometric parameter determined, that is to say taking into account this morphologico-geometric parameter determined.

Each of these steps may be performed by the wearer himself, or by another person in charge of producing the eyeglasses. It may be the optician or the manufacturer. Step b) may be achieved beforehand and the result used later by the wearer.

In practice, when said morphologico-geometric parameter of said wearer relates to a category of wearer based on age and/or geographic origin of the wearer, it may be determined in step b) by asking to the wearer its age and/or geographic origins in order to classify the wearer into a category of wearer based on age and/or geographic origin of the wearer.

The classification may also be approximately made by the optician or manufacturer based on his experience.

Then, in step c), said geometrical feature Lp, H, Ln, Hn of the customized bridge 131 is determined statistically taking into account said morphologico-geometric parameter determined. The geometric feature Lp, H, Ln, Hn is for example determined based on statistical average values of the dimensions of the nose of the wearer and interpupillary distance of wearers corresponding to this age and/or geographic origins category.

More precisely, when the said morphologico-geometric parameter of the wearer is the parameter relative to a category of wearer based on age and/or geographic origin of the wearer, several categories of wearer are predetermined.

For example, a first category regroups wearers 5 years old or younger, a second category regroups wearers of age between 5 and 10 years old, a third category regroups wearers of age between 10 and 15 years old and a fourth category regroups wearers above 15 years. A table or abacus links each category to a value of at least one of the geometric features of the bridge listed above. This value may be determined as a mean or average value for the corresponding age category.

For example, the age of the wearer is linked to the size of his head, which means it is linked to the interpupillary distance and shape of the nose.

Therefore, each age category is associated with a value of the length Lp of bridge 131 extending between said lenses 113, 123, this length being longer, the older the wearer is. In a similar fashion, each age category may be associated with a value of the interior with and/or height of the recess of the bridge, these dimensions being bigger, the older the wearer is.

Other categories may regroup people with European origins, people with Asian origins or people with African origins. These categories may be detailed with sub-categories with nationalities, for example. Statistical models including mean width of the nose and mean height of the nose for people of these origins may then be taken into account for determining the value of the geometrical feature Lp, H, Ln, Hn of the customized bridge 131, in particular for determining the interior width and height of the recess 1325 of the customized bridge 131.

The mean width and height may be determined by an arithmetic mean on a given sample population or an expected value of the distribution of width and height among a given population. Median width and height may also be used.

In practice, in step c), the information about the age and/or geographic origins of the wearer is for example inputted into a computer software comprising a table associating the statistically predetermined geometric feature of the customized bridge 131 to the morphologico-geometric parameter determined.

Step c) may also be simply achieved by reading a table or an abacus giving the geometric feature Lp, H, Ln, Hn of the customized bridge 131 corresponding to the age and/or geographic origin of the wearers.

When the morphologico-geometric parameter of said wearer relates to the interpupillary distance of the wearer or to the position of one or both pupils of the wearer in a referential linked to the head of the wearer, in step b), this interpupillary distance or this position may be measured directly on the wearer, or on an image of the wearer.

In particular, when the morphologico-geometric parameter is determined by the wearer himself, or by a manufacturer located far from the wearer, it is possible to use an image captured by the wearer himself, for example with his telephone or with a webcam.

The position of one or both pupils of the wearer may be for example determined relative to another remarkable point of the face of the wearer, for example, root or tip of the nose or one of the corner of the eyes. The referential linked to the head of the wearer may have an origin at one of these remarkable points, a first axis with a direction parallel to a sagittal plane of the head, a second axis with a direction perpendicular to the sagittal plane, and a third axis with a direction perpendicular to the direction of the first axis, parallel to said sagittal plane.

Preferentially, the first axis is oriented to be vertical in a natural posture of the wearer, that is to say, when the wearer gaze is directed toward a distant target and the head of the wearer moves freely.

The interpupillary distance or the position of the pupil of the eye is then determined based on a pattern recognition treatment of this image, allowing to identify the image of the pupils of the wearer and subsequently determine the distance between the images of the pupils of the wearer or their position, which gives the distance between the pupils of the wearer or the position of the pupils in the referential linked to the head of the wearer after scaling.

In this case, in step c), the geometric feature of the customized bridge 131, in particular, the width Lp of the customized bridge 131, may be determined either by a calculation taking into account the interpupillary distance or position of the pupil determined, or by a statistical determination, for example as a mean value of the geometrical feature of adapted bridges for wearers having this interpupillary distance or position of the pupil.

In a variant, in step c), the information about the pupillary distance or position of the pupil of the wearer is for example inputted into a computer software comprising a table associating the statistically predetermined geometric feature of the customized bridge 131 to the morphologico-geometric parameter determined. An example of table is given in the following.

Step c) may also be simply achieved by reading a table or an abacus giving the geometric feature of the customized bridge 131 corresponding to the interpupillary distance and/or pupils position of the wearers.

In some cases, the morphologico-geometric parameter of said wearer relating to the position of the pupils of the wearer in the referential linked to the head of the wearer may be in relation with the pupil height compared to the bottom edge of the ophthalmic lens, that is to say, the fitting height of the wearer.

This distance may be measured directly on the wearer equipped with the eyeglasses, or on an image of the wearer wearing the eyeglasses.

When the half-frames 110, 120 are supplied with the set 130;230 of bridges, in step b), the wearer tries on the eyeglasses 10 obtained by assembling the two half-frames 110, 120 with each bridge of the set 130; 230 of bridges and determine the distance between its pupil and the lower edge of the ophthalmic lens 112, 122 for each bridge of the set 130;230.

In this case, in step c), the geometrical feature of the customized bridge 131, in particular the global height H and interior height Hn of the customized bridge 131 may be determined by choosing the bridge among said set 130;230 of bridges that is best adapted to his face regarding the pupil height of the wearer.

To this end, a fitting height target value, predetermined based on the centering characteristics of the ophthalmic lens received in said half-frames, is provided and the customized bridge is chosen by comparing the determined value of the fitting height with this target value.

The morphologico-geometric parameter associated with the fitting height of the wearer may also be determined as the difference between the reference fitting height measured for the wearer with the reference eyeglasses of known geometry mentioned before and an approximate fitting height determined as a function of the half-frame geometry in the kit, using the formula $K*B+M$, where B is the vertical boxing distance of the half-frame, K and M are predetermined constants, for example the formula $B/2+4$ for standard progressive addition lenses, where B is the vertical boxing distance of the half-frame.

In other cases, the fitting height may be determined only as a function of the geometry of the half-frames chosen by the wearer, not as a morphologico-geometric parameter of the wearer.

More precisely, it is possible to approximate the fitting height FH to the value obtained with the following formula: $FH=K*B+M$, where B is the vertical boxing distance of the half-frame, K and M are predetermined constants.

For example, the fitting height may be approximated by $B/2+4$, as mentioned before.

As described before, a table can be provided to associate one or two types of bridges with a given couple of parameters including interpupillary distance and fitting height, or to the interpupillary distance parameter only.

The table may also take into account the approximate fitting height.

In the following example, the parameter associated with the fitting height is here determined as the difference between the reference fitting height measured for the wearer with the reference frame and the approximate fitting height determined as a function of the half-frame geometry in the kit, using the formula $B/2+4$, where B is the vertical boxing distance of the half-frame.

The following example of table indicates which bridge of the set 230 of bridges shown on FIG. 4 is to be chosen for a wearer exhibiting parameters in the intervals specified in this table in millimeters.

| Index of the bridge of FIG. 4 to choose as a function of half-interpupillary distance parameter (lines) and fitting height parameter (column) in millimeters | [25-28] | ]28-32] | ]32-35] | ]35-40] |
|---|---|---|---|---|
| [−3, −2] | 234 | 235 | 233 | 233 |
| ]−2, 0] | 234 | 235 or 238 | 235 or 236 | 232 |
| ]0, 1] | 234 or 237 | 235 or 238 | 236 | 232 |
| ]1, 2] | 237 | 231, 238 | 236 | 232 |
| ]2, 3] | 237 | 231 | 236 | 232 |

When the morphologico-geometric parameter of said wearer relates to the shape of the nose of the wearer, measures relative to the dimensions of the nose may be measured directly on the wearer, or on an image of the wearer. The shape of the nose may also be determined statistically.

The morphologico-geometric parameter relating to the shape of the nose of the wearer may be for example one of the following:
- a width of the nose measured between the eyes of the wearer, at the root of the nose,
- a height of the nose measured from the corner of the eye to the ridge of the nose,
- the angle between the ridge of the nose and each of the wings of the nose.

The morphologico-geometric parameters may also be defined thanks to a model of the nose being globally tetrahedral, with a triangular base delimited by three points, for example tip of the nose and ends of the wings of the nose, the summit being placed at the root of the nose, between the eyes of the wearer.

The morphologico-geometric parameters of the wearer may then be relative to any angle between to surfaces or straight lines of this model or any distance between two points defined based on this model.

Preferentially, in the first embodiment of the method, in step d), the set 130;230 of bridges is provided. In practice, it is provided with the two half-frames 110, 120, which means that step a) and part of step d) are achieved simultaneously.

In this case, in step c), the geometrical feature Lp, H, Ln, Hn of the bridge is determined by choosing one bridge among the set of bridges provided, based on said morphologico-geometric parameter of the wearer.

More precisely, in order to achieve step d), said bridge may be chosen among said set 130;230 of bridges by the following steps:
- attaching alternatively each bridge of said set 130; 230 of bridges to the half-frames 110, 120,
- trying alternatively the eyeglasses obtained by attaching each bridge of said set 130;230 of bridges to the half-frames 110, 120 on the face of the wearer,
- determining which bridge of the set 130;230 of bridges fits the wearer best.

This last step may be achieved based on the feeling of the wearer, or based on an objective criterion.

For example, in the case where the morphologico-geometric parameter of the wearer is its pupil height, this may be achieved as described before, by comparing the fitting height determined when trying on the eyeglasses with a target value. In this case, steps c) and d) are achieved at least partly simultaneously.

Another criterion could be to maximize the contact surface between the recess of the bridge and the nose of the wearer.

Alternatively, the software, table or abacus indicates directly to the wearer or the person in charge of assembling the eyeglasses which customized bridge of the provided set 130;230 of bridges needs to be used to obtain the eyeglasses 10 adapted to the wearer.

In particular, said customized bridge is chosen among said set 130;230 of bridges by reading on an abacus which bridge among the set 130;230 of bridges is to be chosen given the morphologico-geometric parameter of the wearer determined.

For example, in the case of the second example of set 230 of bridges shown on FIG. 4, a wearer having determined in step b) that his interpupillary distance is 63 millimeter, will search in the abacus or table which of the eight bridges of this set is recommended for this value of the interpupillary distance.

The table or abacus may recommend several possible bridges. Discrimination between theses bridges may be achieved by using another morphologico-geometric parameter of the wearer, for example his geographic origin.

In another example, one may provide ophthalmic lenses with a mark or dot identifying the position of the fitting point of the ophthalmic lenses of the half-frames. It is then possible to verify if the pupils of the wearer are aligned with the marks or dots while trying on the eyeglasses. The bridge of the set 130; 230 of bridges for which the pupils of the wearer are better aligned with the marks or dots is chosen and attached to the half-frames in step c) and d).

In a variant, the ophthalmic lens is provided with a mark or dot indicating the position of its optical center and the pupil is aligned with this optical center.

The morphologico-geometric parameter of the wearer determined in step b) is then relative to the match between the position of the pupils of the eyes of the wearer and the position of the optical centers of the lenses.

In the second embodiment of the method, the geometric feature Lp, H, Ln, Hn determined in step c) is transmitted to a production unit programmed to manufacture the customized bridge 131 with the appropriate geometric feature.

In this case, in step d), said customized bridge 131 having the geometrical feature Lp, H, Ln, Hn determined is manufactured for example by additive technology.

Alternatively, it may be manufactured by milling of a plastic part.

The customized bridge thus manufactured is then the only bridge provided to the wearer.

It is assembled with the half-frames 110, 120 in order to obtain the customized eyeglasses 10.

It is to be understood that the invention thus provides an advantageous method for ordering eyeglasses adapted to a wearer, according to which said wearer orders an eyeglasses kit as described before, and builds himself said eyeglasses according to the method described before.

The eyeglasses kit 100 may be ordered online.

In a first embodiment of the method for ordering eyeglasses according to the invention, the wearer does not provide any information and no pictures of him is attached to the order.

The wearer receives the eyeglasses kit 100 as described before, reads the abacus provided with the eyeglasses kit 100, and determines, based on his morphologico-geometric parameter, which bridge from the set 130; 230 he needs to attach to the half-frames 110, 120 in order to obtain the eyeglasses adapted to his face.

Alternatively, the wearer tries on the eyeglasses obtained with each bridge of the set 130;230 of bridges provided with the eyeglasses kit 100, and determines which customized bridge fits best his face.

He then builds himself the eyeglasses 10 by attaching the customized bridge 131 chosen from the set 130; 230 of bridges to the half-frames 110, 120.

In a second embodiment of the method for ordering eyeglasses, the wearer provides information about his age and/or geographic origin while ordering.

Images of the wearer may also be taken by the webcam of the wearer's computer, or the wearer may provide pictures of himself that are uploaded and attached to his order.

In this second embodiment, the person managing the online orders may then choose the customized bridge 131 adapted to the wearer among the set 130;230 of bridges and include only this customized bridge 131 in the kit 100 or the eyeglasses 10 received by the wearer.

Alternatively, the set 130;230 of bridges included in the kit 100 sent to the wearer may be adapted to fit the wearer having the morphologico-geometric parameter determined.

Alternatively, the customized bridge 131 is manufactured with geometrical features taking into account the morphologico-geometric parameter and sent to the wearer.

Advantageously, the branches 111, 121 of the half-frames 110, 120 may have an adaptable length or an adaptable distance to the corresponding rim of the half-frame or ophthalmic lens.

The eyeglasses 10 according are adapted to the face of the wearer and therefore comfortable. They also have esthetic advantages as the color and material of the bridge and half-frames may be chosen or changed, by the wearer.

The invention claimed is:

1. Eyeglasses adapted to a wearer, the eyeglasses comprising:
   two half-frames interconnected by a bridge, each half-frame comprising at least a branch and an ophthalmic lens, said bridge of the eyeglasses being made of a separated element attached to each of said half-frames, said bridge having at least one geometrical feature determined by taking into account one or more of:
      a first morphologico-geometric parameter of said wearer relative to a category of wearer based on one or more of age and geographic origin of the wearer, and
      a second morphologico-geometric parameter relative to the position of one or both pupils of the wearer in a referential linked to the head of the wearer.

2. The eyeglasses according to claim 1, wherein said bridge is selectable from a set of bridges comprising at least two predetermined bridges, said geometrical feature of each bridge of the set of predetermined bridges being different from the geometrical feature of the other bridges of the set.

3. The eyeglasses according to claim 1, wherein said bridge comprises a mounting system configured to attach said bridge to said ophthalmic lenses or to rims of said half-frames receiving said ophthalmic lens.

4. The eyeglasses according to claim 1, wherein said geometrical feature of the bridge comprises at least one of the following features:
   a length of extending between said lenses,
   an interior width of the bridge receiving the nose of the wearer,
   an interior height of the bridge receiving the nose of the wearer, and
   a global height of bridge.

5. The eyeglasses according to claim 1, wherein said first morphologico-geometric parameter of said wearer or the second morphologico-geometric parameter relative to the position of the one or both pupils further comprises at least one of the following:
   a parameter relative to an interpupillary distance between the pupils, and
   a parameter relative to a shape of the nose of the wearer.

6. The eyeglasses according to claim 2, wherein said bridge comprises a mounting system configured to attach said bridge to said ophthalmic lenses or to rims of said half-frames receiving said ophthalmic lens.

7. The eyeglasses according to claim 2, wherein said geometrical feature of the bridge comprises at least one of the following features:
   a length of extending between said lenses,
   an interior width of the bridge receiving the nose of the wearer,
   an interior height of the bridge receiving the nose of the wearer, and
   a global height of bridge.

8. The eyeglasses according to claim 3, wherein said geometrical feature of the bridge comprises at least one of the following features:
- a length of extending between said lenses,
- an interior width of the bridge receiving the nose of the wearer,
- an interior height of the bridge receiving the nose of the wearer, and
- a global height of bridge.

9. The eyeglasses according to claim 2, wherein said first morphologico-geometric parameter of said wearer or the second morphologico-geometric parameter relative to the position of the one or both pupils further comprises at least one of the following:
- a parameter relative to an interpupillary distance between the pupils, and
- a parameter relative to a shape of the nose of the wearer.

10. An eyeglasses kit for manufacturing eyeglasses, the kit comprising:
- two half-frames, each half-frame comprising at least a branch and an ophthalmic lens; and
- a set of at least two predetermined bridges having different geometrical features, each bridge of the set of bridges being provided as a separated element configured to be attached to each of said half-frames,
- wherein each bridge of the set of bridges has at least one geometrical feature determined by taking into account one or more of:
  - a first morphologico-geometric parameter of said wearer relative to a category of wearer based on one or more of age and geographic origin of the wearer, and
  - a second morphologico-geometric parameter relative to the position of one or both pupils of the wearer in a referential linked to the head of the wearer.

11. The eyeglasses kit according to claim 10, wherein said set of bridges comprises a number of bridges less than or equal to 10, each of the bridges having a combination of geometrical features different from the combination of geometrical features of the other bridges of said set of bridges.

12. The eyeglasses kit according to claim 10, wherein the number of bridges of the set of bridges and/or the geometrical features of each bridge of the set of bridges is determined as a function of said first morphologico-geometric parameter of said wearer.

13. The eyeglasses kit according to claim 12, wherein the number of bridges of said set of bridges and/or the combinations of geometrical features of each bridge of the set of bridges is determined in order to statistically be adapted to the wearer given said first morphologico-geometric parameter of said wearer.

14. A method for manufacturing eyeglasses adapted to a wearer, the method comprising:
- providing two half-frames, each half-frame comprising at least a branch and an ophthalmic lens, configured to be interconnected by a bridge;
- one or more of determining a morphologico-geometric parameter of the wearer relative to a category of wearer based on one or more of age and geographic origin of the wearer, and a second morphologico-geometric parameter relative to the position of one or both pupils of the wearer in a referential linked to the head of the wearer;
- determining a geometrical feature of the bridge of the eyeglasses based on one or more of said determined first morphologico-geometric parameter of the wearer and the second morphologico-geometric parameter; and
- providing the bridge exhibiting said geometrical feature and attaching the bridge to said half-frames in order to form said eyeglasses.

15. The method according to claim 14, wherein said first morphologico-geometric parameter of the wearer or the second morphologico-geometric parameter relative to the position of the one or both pupils is further determined by:
- determining said morphologico-geometric parameter of the wearer based on a captured image of the wearer.

16. The method according to claim 14, wherein said geometrical feature of the bridge is determined by one of the following:
- calculating the geometrical feature of the bridge as a function of one or more of said determined first morphologico-geometric parameter and the determined second morphologico-geometric parameter, and
- determining statistically said geometrical feature of the bridge as a function of one or more of said determined first morphologico-geometric parameter and the determined second morphologico-geometric parameter.

17. The method according to claim 14, wherein providing the bridge comprising providing a set of bridges comprising at least two bridges having at least one different geometrical feature, each bridge being provided as a separated element configured to be attached to each of said half-frames, and
- the geometrical feature of the bridge is determined by choosing one bridge among the set of bridges provided, based on one or more of said first morphologico-geometric parameter of the wearer and the second morphologico-geometric parameter.

18. The method according to claim 17, wherein said bridge is chosen among said set of bridges by the following:
- alternatively attaching each bridge of said set of bridges to the half-frames,
- alternatively trying the eyeglasses obtained by attaching each bridge of said set of bridges to the half-frames on the face of the wearer, and
- determining one of the bridges of the set of bridges fits the wearer best.

19. The method according to claim 17, wherein said bridge is chosen among said set of bridges by the following:
- reading on an abacus a bridge among the set of bridges is to be chosen given one or more of the determined first morphologico-geometric parameter of the wearer and the determined second morphologico-geometric parameter.

20. A method for ordering eyeglasses adapted to a wearer, the method comprising:
- said wearer ordering an eyeglasses kit comprising two half-frames, each half-frame comprising at least a branch and an ophthalmic lens, and a set of at least two predetermined bridges having different geometrical features, each bridge of the set of bridges being provided as a separated element configured to be attached to each of said half-frames, each said bridge having at least one geometrical feature determined by taking into account one or more of a first morphologico-geometric parameter of said wearer relative to a category of wearer based on one or more of age and geographic origin of the wearer, and a second morphologico-geometric parameter relative to the position of one or both pupils of the wearer in a referential linked to the head of the wearer; and building said eyeglasses using the method for manufacturing eyeglasses of claim 17.

* * * * *